(12) United States Patent
Martinez et al.

(10) Patent No.: US 6,644,897 B2
(45) Date of Patent: Nov. 11, 2003

(54) PNEUMATIC DRILLING END EFFECTOR

(75) Inventors: Antonio B. Martinez, Aliso Viejo, CA (US); Eric Whinnem, Whittier, CA (US); Angelica Davancens, Reseda, CA (US); William Paul Zanteson, Monrovia, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/306,029

(22) Filed: Nov. 27, 2002

(65) Prior Publication Data

US 2003/0077132 A1 Apr. 24, 2003

Related U.S. Application Data

(62) Division of application No. 09/815,210, filed on Mar. 22, 2001, now Pat. No. 6,514,018.

(51) Int. Cl.[7] .............................. B23B 35/00
(52) U.S. Cl. .................. 408/1 R; 408/97; 408/234
(58) Field of Search .................. 408/1 R, 56, 61, 408/97, 13, 14, 11, 67, 5, 7, 15, 95, 234, 16; 483/901

(56) References Cited

U.S. PATENT DOCUMENTS

| | | |
|---|---|---|
| 3,973,858 A | 8/1976 | Poisson et al. |
| 4,329,092 A | 5/1982 | Ponitzsch et al. |
| 4,330,052 A | 5/1982 | Schymick |
| 4,418,767 A | 12/1983 | Vindez |
| 4,637,775 A | 1/1987 | Kato |
| 4,714,339 A | 12/1987 | Lau et al. |
| 4,784,540 A | 11/1988 | Underhaug |
| 4,818,154 A | 4/1989 | Bye et al. |
| 4,948,308 A | 8/1990 | Giannuzzi et al. |
| 5,106,290 A | 4/1992 | Carver et al. |
| 5,203,650 A | 4/1993 | McCourtney |
| 5,203,855 A | 4/1993 | Givler et al. |
| 5,213,454 A | 5/1993 | Givler et al. |
| 5,277,523 A | 1/1994 | Jones |
| 5,299,894 A | 4/1994 | McCowin |
| 5,379,508 A | 1/1995 | Givler et al. |
| 5,380,978 A | 1/1995 | Pryor |
| 5,458,443 A | 10/1995 | Belge et al. |
| 5,482,409 A | 1/1996 | Dunning et al. |
| 5,848,859 A | 12/1998 | Clark et al. |
| 5,910,894 A * | 6/1999 | Pryor .......................... 700/95 |
| 5,949,685 A | 9/1999 | Greenwood et al. |
| 6,012,877 A | 1/2000 | McCowin et al. |
| 6,039,518 A | 3/2000 | Day |
| 6,043,621 A | 3/2000 | Neumann |
| 6,158,929 A | 12/2000 | Fisher |
| 6,231,280 B1 | 5/2001 | Bullen |
| 6,514,018 B2 * | 2/2003 | Martinez et al. ............... 408/14 |
| 2003/0031383 A1 * | 2/2003 | Gooch ......................... 382/291 |
| 2003/0048459 A1 * | 3/2003 | Gooch ......................... 356/620 |
| 2003/0090682 A1 * | 5/2003 | Gooch et al. ................. 356/620 |

\* cited by examiner

Primary Examiner—Daniel W. Howell
(74) Attorney, Agent, or Firm—Harness Dickey & Pierce P.L.C.

(57) ABSTRACT

A method of using a drilling end effector includes providing a drilling end effector having a plurality of photogrammetry targets secured thereto. The positional orientation of the drilling end effector along six degrees of freedom is detected using a photogrammetry sensor to determine the orientation of the plurality of photogrammetry targets and outputting a position signal to a controller. The drilling end effector is robotically manipulated adjacent to a part to be drilled in response to the position signal to accurately position a drill bit relative to the part to be drilled. The part is then drilled.

19 Claims, 7 Drawing Sheets

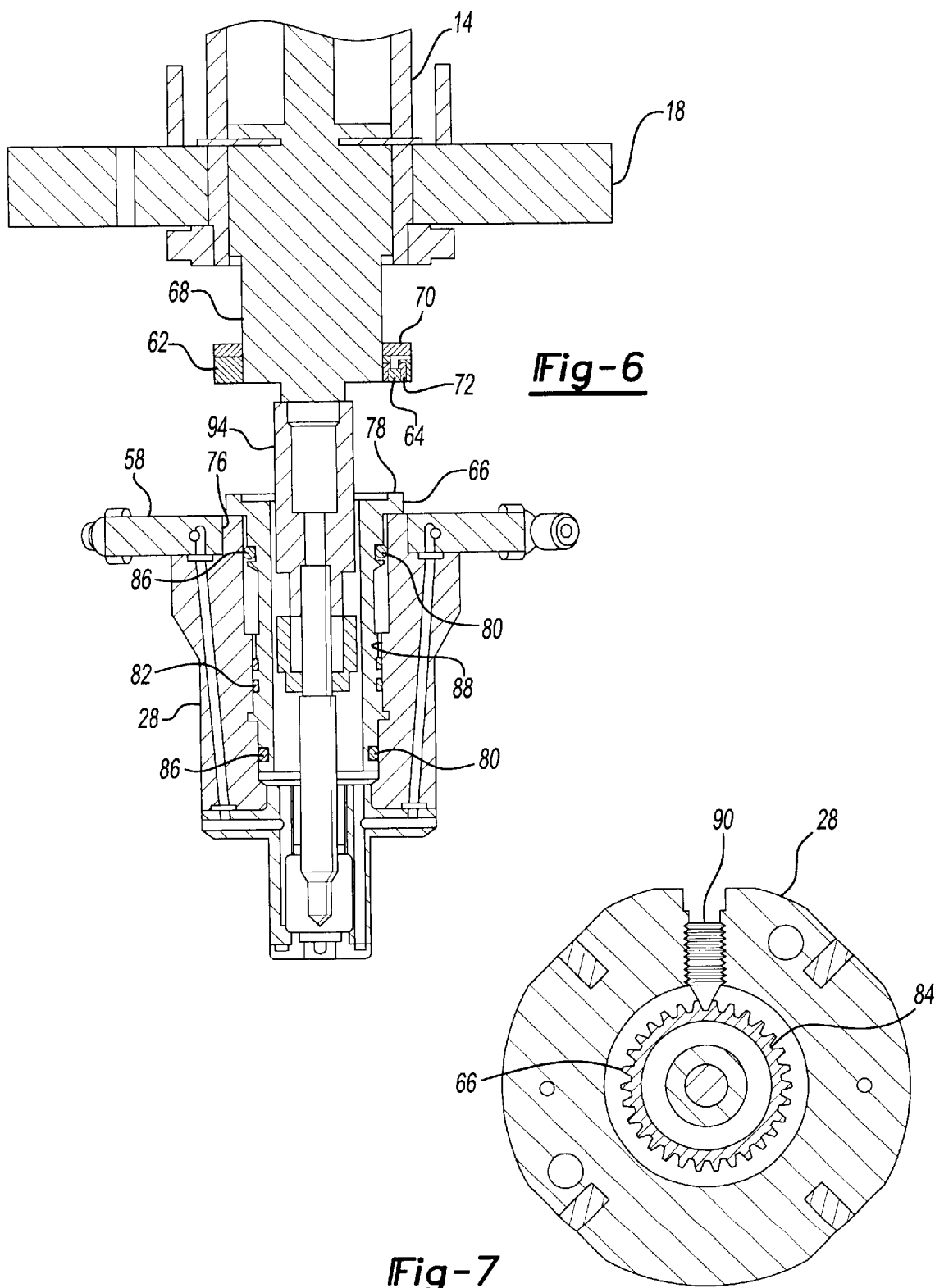

PNEUMATIC DRILLING END EFFECTOR

CROSS-REFERENCE TO RELATED APPLICATIONS

This application is a divisional of U.S. patent application No. 09/815,210 filed on Mar. 22, 2001, now U.S. Pat. No. 6,514,018. The disclosure of the above patent is incorporated herein by reference.

FIELD OF THE INVENTION

This invention relates to end effectors manipulated by robotic arms and, more particularly, to an end effector capable of applying a clamping force while drilling, sensing the surface of the work piece to accommodate variations in distance, removing metal chips, delivering a spray mist of lubricant to a drill tip, and employing photogrammetry position targeting.

BACKGROUND OF THE INVENTION

In a traditional manufacturing process, manipulation and processing of products are typically accomplished manually by workers. In the case of modern aircraft manufacturing, this manual manipulation and processing frequently includes manually drilling a multitude of holes through materials such as titanium and the like. The accuracy of these holes is highly dependent upon the skill of the worker. It is also frequently necessary to prepare these holes with countersunk sections to enable a fastener to lie generally flush with the material surface. To this end, it is necessary to maintain high tolerances and repeatability of drill depth in such applications. As can be appreciated, such work is extremely dependent upon the skill of the worker and also requires enormous amounts of worker endurance. Accordingly, there exists a need in the relevant art to provide an end effector capable of expeditiously drilling numerous highly accurate fastener holes in a part.

Moreover, as mentioned above, aircraft manufacturing requires high tolerances to be maintained to ensure that the aircraft is able to withstand the rigors of flight. To this end, it is necessary to ensure the depth and location of fastener holes are predictable and accurate, irrespective of the actual positioning of the part to be drilled relative to the drilling apparatus. Accordingly, there exists a need in the relevant art to provide an end effector capable of drilling numerous fastener holes within high tolerances.

Still further, titanium is frequently used in the manufacturing of aircraft. As is known to those skilled in the art, titanium is a very strong and lightweight material particularly well suited for use in structurally demanding applications. However, due to the strength characteristics of titanium, it is often necessary to provide a lubricating fluid to the working tool in an attempt to extend the useful life of the working tool. Accordingly, there exists a need in the relevant art to provide an end effector having a self-contained lubricating system.

Accordingly, it is a principal object of the present invention to provide a drilling end effector capable of expeditiously drilling numerous fastener holes in an aircraft.

It is another object of the present invention to provide a drilling end effector capable of drilling numerous fastener holes within high tolerances.

It is another object of the present invention to provide a drilling end effector having a self-contained lubricating system.

It is yet another object of the present invention to provide a drilling end effector that is not susceptible to the shortcomings of the prior art methods.

SUMMARY OF THE INVENTION

The above and other objects are provided by a drilling end effector in accordance with preferred embodiment of the present invention. Specifically, a method of using a drilling end effector is provided that comprises providing a drilling end effector having a plurality of photogrammetry targets secured thereto. The positional orientation of the drilling end effector along six degrees of freedom is detected using a photogrammetry sensor to determine the orientation of the plurality of photogrammetry targets and outputting a position signal to a controller. The drilling end effector is robotically manipulated adjacent to a part to be drilled in response to the position signal to accurately position a drill bit relative to the part to be drilled. The part is then drilled.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various advantages of the present invention will become apparent to one skilled in the art by reading the following specification and subjoined claims and by referencing the following drawing in which:

FIG. 6 is an enlarged cross sectional view illustrating the lower section of the drilling end effector having portions removed for clarity;

FIG. 7 is a cross sectional view illustrating the adjustment mechanism of the adjustable hard stop assembly;

DETAILED DESCRIPTION OF THE PREFERRED EMBODIMENTS

Figure 1:
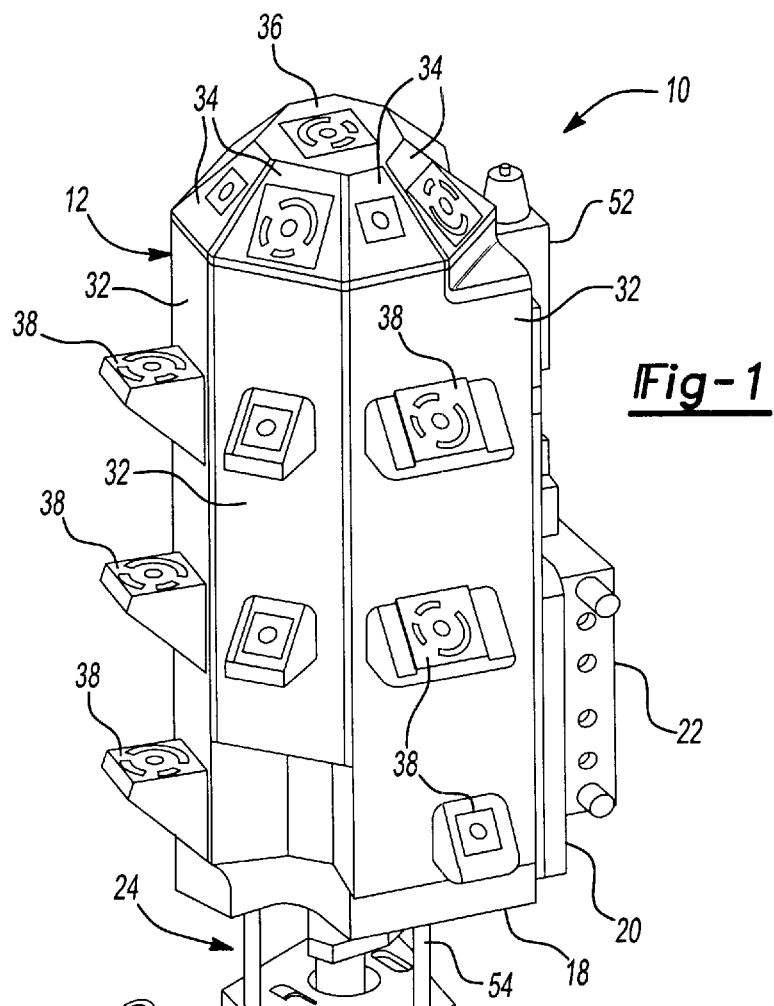
FIG. 1 is a perspective view illustrating a drilling end effector according to a first embodiment of the present invention.
Figure 2:
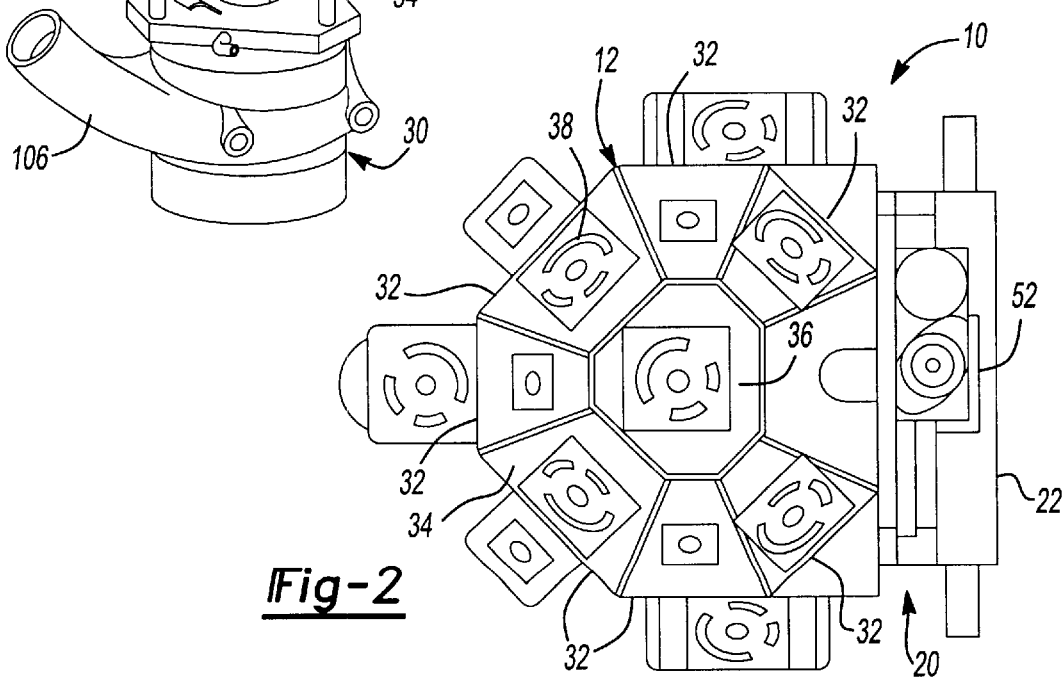
FIG. 2 is a plan view illustrating the drilling end effector of FIG. 1.
Figure 3:
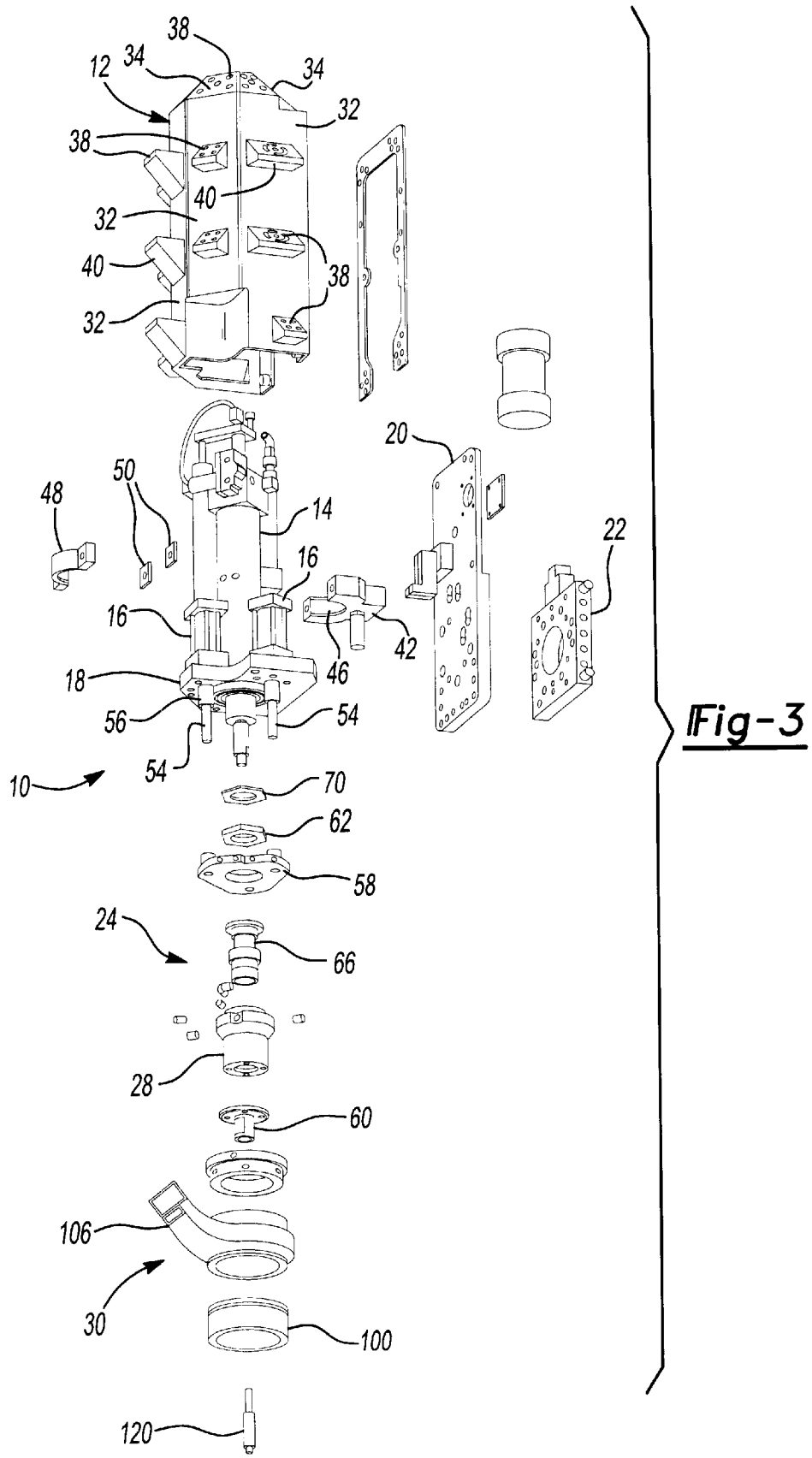
FIG. 3 is an exploded perspective view illustrating the drilling end effector.

Referring to FIGS. 1–3, a drilling end effector 10 is shown according to a first embodiment of the present invention having a housing 12, a drill motor 14, pneumatic cylinders 16, a platform 18, a back plate 20, a tool changer interface plate 22, an adjustable hard stop assembly 24, a collet housing 28, and a vacuum attachment collar assembly 30.

Drilling end effector 10 is adapted to be mounted to a conventional robotic arm assembly (not shown) for at least partial manipulation thereby. Recently, robots have taken on an ever-increasing roll in the manufacture of complicated goods and the like.

It should first be understood that drilling end effector 10 of the present invention may be used in any orientation and, thus, any reference to direction contained within this disclosure should be understood to apply to the drilling end effector being in an upright position or that position shown in the illustration.

Still referring to FIGS. 1–3, housing 12 is preferably an elongated member having a plurality of generally flat side panels 32. Housing 12 further includes a corresponding number of generally inclined panels 34. In the particular embodiment illustrated, inclined panels 34 are each trapezoidal in shape such that they incline inwardly from side panels 32 and terminate in an end panel 36. End panel 36 is generally octagonal in shape as dictated by the particular geometrical configuration of the present embodiment. However, it should be understood that housing 12 might be of any shape conducive to the particular environment or application in which the drilling end effector will be used.

Side panels 32, inclined panels 34, and end panel 36 of housing 12 each further include at least one photogrammetry target 38 fixedly mounted thereto. In particular, each photogrammetry target 38 that is mounted to side panels 32 is secured using a generally angular bracket 40. Angular bracket 40 is disposed such that photogrammetry targets 38 are arranged in an orientation sufficient to be detected by a photogrammetry sensor (not shown) in order to determine the position of drilling end effector 10 within the three-dimensional workspace. Preferably, photogrammetry targets 38 are spaced in angular orientation 40–60 degrees around housing 12. Photogrammetry targets 38 are preferably positioned on four vertical levels separated by approximately 4½ inches. Further to this end, photogrammetry targets 38 are disposed upon inclined panels 34 and end panel 36 to provide additional targets for detection by the photogrammetry sensor from above. Testing has shown that this orientation or distribution of photogrammetry targets 38 enables precise positioning of drilling end effector 10 in space in six degrees of freedom (three linear and three rotational).

Housing 12 is secured to platform 18 and back plate 20 so as to provide a rigid member for carrying photogrammetry targets 38 so as to aid in accurately determining the position and orientation of drilling end effector 10.

As best seen in FIG. 3, drill motor 14 is shown fixedly mounted to back plate 20 and platform 18. To this end, a mounting bracket 42 includes a base support 44 that is securely mounted to back plate 20. Mounting bracket 42 includes a generally semi-circular portion 46 sized to receive the generally cylindrical body of drill motor 14. A corresponding semi-circular attachment member 48 is provided for securing drill motor 14 to mounting bracket 42. An optional pair of washers 50 is positioned between attachment member 48 and mounting bracket 42. A pair of fasteners (not shown), such as bolts, secures attachment member 48 to base support 44. This arrangement securely retains drill motor 14 relative to back plate 20.

Referring now to FIGS. 1–3, tool changer interface plate 22 is fastened to back plate 20. Tool changer interface plate 22 is mateable to a tool changer (not shown) of the conventional robot arm assembly. Tool changer interface plate 22 acts as a manifold for compressed air to operate drill motor 14, the drill feed mechanism, and the chip blast, and as a lubrication manifold for the lubrication system of drilling end effector 10.

Figure 4:
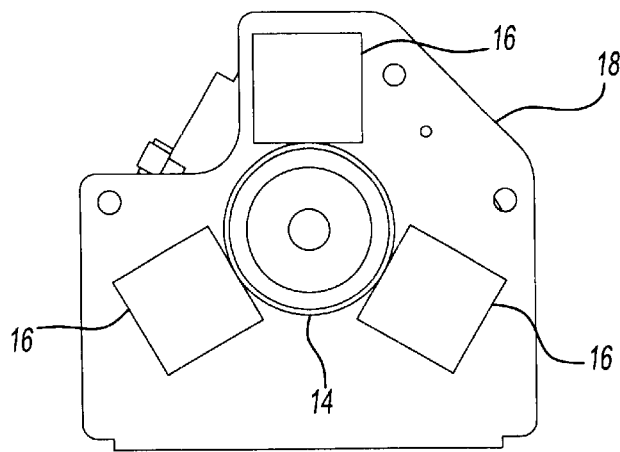
FIG. 4 is a plan view illustrating pneumatic cylinders with elements removed for clarity.
Figure 5:
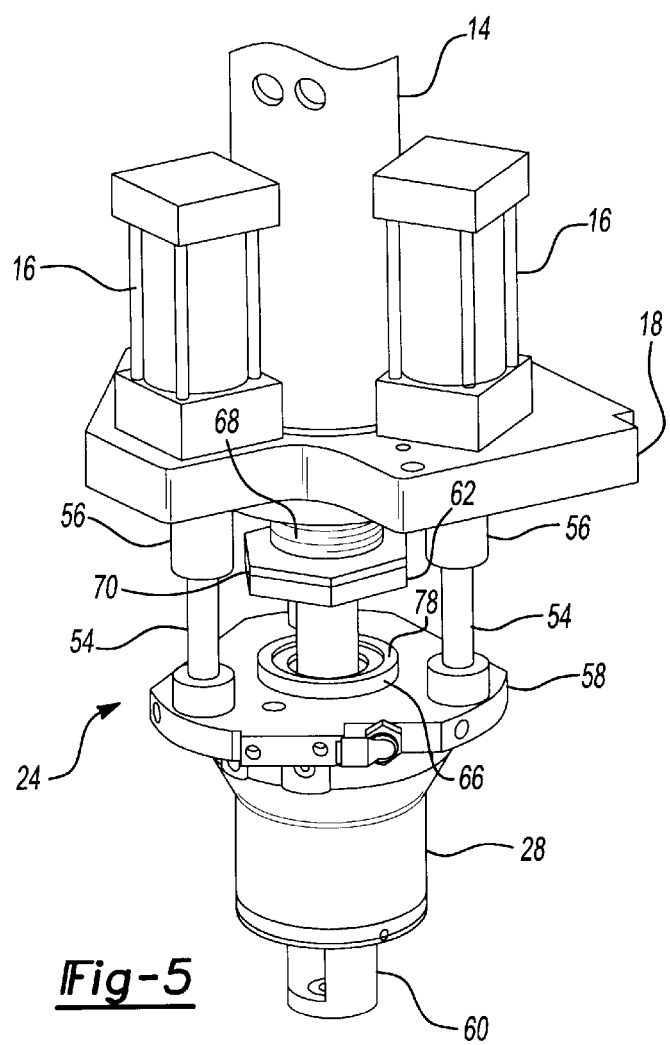
FIG. 5 is an enlarged perspective view illustrating a lower section of the drilling end effector.

Referring in particular to FIGS. 3–5, pneumatic cylinders 16 are radially mounted to platform 18 and extending downwardly therefrom. Specifically, pneumatic cylinders 16 each include a slidable drive arm 54 extending through a support 56 formed in platform 18. As will be described in detail below, drive arms 54 are coupled to a pressure foot 58 for applying a material clamping force through collet housing 28 to a drill bushing 60 and vacuum attachment collar assembly 30. In operation, pneumatic cylinders 16 exert a generally constant force of preferably 30 p.s.i. As the robot arm assembly positions drilling end effector 10 in position for drilling, pneumatic cylinders 16 are compressed approximately 0.125", thereby applying a uniform clamping pressure between drill bushing 60 and the underlying support structure supporting the part being drilled.

Figure 9:
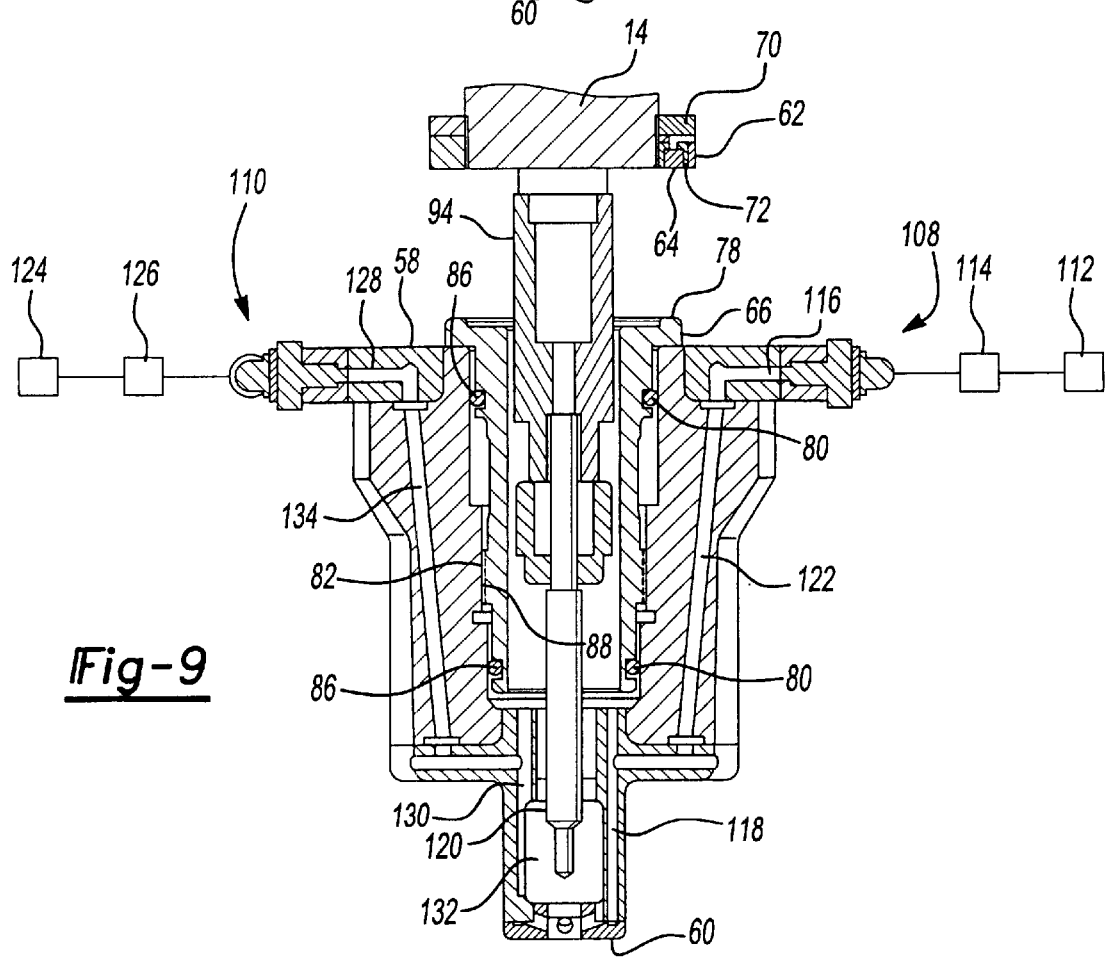
FIG. 9 is an enlarged cross sectional view illustrating the lubrication system and chip blast system of the present invention.

As best seen in FIGS. 5, 6, and 9, adjustable hard stop assembly 24 is shown having a quill nut 62, an electronic sensor 64, and an adjustable hard stop 66. Specifically, quill nut 62 is preferably a hex nut that is threadedly fastened to a quill 68 of drill motor 14. A jamb nut 70 is further threadedly coupled to quill 68 of drill motor 14 adjacent quill nut 62. Jamb nut 70 locks against quill nut 62 to prevent unwanted axial movement of quill nut 62. Quill nut 62 further includes a bore 72 formed in a lower face 74 thereof for receiving electronic sensor 64 therein.

Adjustable hard stop 66 is adjustably mounted within a central bore 76 of pressure foot 58. Adjustable hard stop 66 includes a contact surface 78, a pair of seal receiving channels 80, a threaded section 82, and a plurality of radially-spaced axially-extending grooves 84 (FIG. 7). Contact surface 78 is adapted to contact quill nut 62 or quill 68 to provide the hard stop. The pair of seal receiving channels 80 are each disposed generally radially about the exterior of adjustable hard stop 66 and receive a seal 86 therein. Seal 86 engages adjustable hard stop 66 and collet housing 28 to provide a sealing engagement to minimize dirt and debris therebetween. Threaded section 82 of adjustable hard stop 66 threadedly engages a corresponding threaded section 88 of collet housing 28. Preferably, threaded sections 82, 88 have a thread pitch of 40 threads per inch. Rotation of adjustable hard stop 66 relative to collet housing 28 enables contact surface 78 to be raised or lower to permit adjustment of the drill depth. As best seen in FIG. 7, a spring loaded ball plunger 90 is slidably mounted in collet housing 28 and engages one of the plurality of radially-spaced, axially-extending grooves 84. Preferably, there are 25 radially-spaced, axially-extending grooves 84. Accordingly, this embodiment having 25 radially-spaced, axially-extending groove 84 and thread pitch of 40 threads per inch provides axial drilling depth adjustment control of approximately 0.001". However, it should be understood that other combinations of thread pitch and groove placement may be used to obtain unique depth adjustment control.

Electronic sensor 64 is preferably comprised of a copper button embedded in a nylon sleeve. A wire (not shown) attached to the copper button provides a continuous 24 VDC supply. During operation, as drill motor 14 and, thus, quill 68 approach and contacts contact surface 78 of adjustable hard stop 66, the copper button of electronic sensor 64 contacts contact surface 78, thereby shorting to ground. This short causes a signal to be sent to the robot controller input/output board. When the signal indicating the drill has reached the end of the stroke has been received by the robot controller and after an optional programmable delay, drill motor 14 retracts the drill and thus completes the drilling cycle.

Collet housing 28 is coupled to pressure foot 58 via a plurality of fasteners (not shown). Collet housing 28 is generally tubular in shape having an interior hollow portion sufficiently sized to receive a collet 94 slidably therethrough. Collet 94 is coaxially aligned and operably coupled to drive motor 14 in a manner known in the art.

Figure 8:
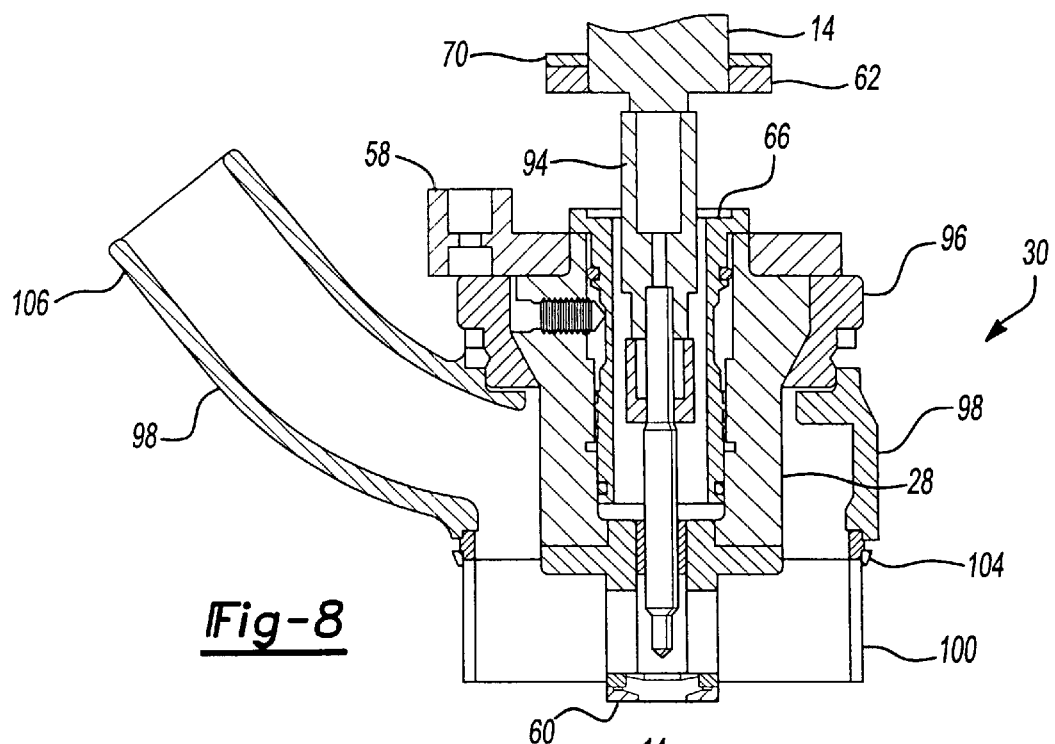
FIG. 8 is a cross sectional view illustrating the vacuum attachment assembly.

As best seen in FIG. 8, vacuum attachment collar assembly 30 includes a vacuum attachment insert 96, a vacuum attachment 98, and a collar 100. Vacuum attachment insert 96 is generally cylindrical in shape so as to correspond to collet housing 28. Vacuum attachment insert 96 is secured to collet housing 28 via a plurality of fasteners, such as spring ball plungers and corresponding detents or the like. The use of spring ball plungers and detents permits easy engagement and disengagement of vacuum attachment collar assembly 30 and further enables vacuum attachment collar assembly 30 to be used with multiple end effectors.

Vacuum attachment 98 is in turn coupled to vacuum attachment insert 96 via a known method, such as threaded coupling, welding, and the like. Collar 100 extends from a lower end 104 of vacuum attachment 98. Collar 100 is preferably made of a resilient material, such as rubber or bristled brushes, to enable collar 100 to engage and form a seal on a part to be drilled. Collar 100 thus serves to generally retain any debris and/or lubricant during the drilling process. Vacuum attachment 98 includes at least one vacuum hose connector 106 preferably formed integral therewith and extending upwardly therefrom. Vacuum hose connector 106 is sized to be attached to a hose (not shown) of a vacuum for removing debris and other materials from within vacuum attachment 98 during the drilling process.

The present invention is particularly suited for drilling materials such as titanium. However, in order to maximize the drill life, it is preferable to include a lubrication system and an air blast system for lubricating and cleaning the drilling bit. Moreover, it is preferable to route lubrication and/or air blast pipes internally within the drilling effector to prevent damage during articulation of end effector 10. Referring now to FIG. 9, a lubrication system 108 and an air blast system 110 are shown. Lubrication system 108 includes a lubrication source 112 that is in fluid communication with a valve device 114 and a lubrication inlet passageway 116. Lubrication inlet passageway 116 extends through pressure foot 58. A lubrication outlet passageway 118 extends through drill bushing 60 and terminates near an exit end of drill bushing 60 so as lubricate drill bit 120. An intermediate lubrication passageway 122 extends through collet housing 28 and interconnects lubrication inlet passageway 116 and lubrication outlet passageway 118, thereby defining a fluid path between lubrication source 112 and the exit end of drill bushing 60 so as to provide lubricating oil to drill bit 120 during a drilling operation. Preferably, lubrication source 112 is a lubrication unit providing mist oil employing compressed air and valve device 114 is a solenoid valve.

Still referring to FIG. 9, air blast system 110 includes a compressor or compressed air source 124 that is in fluid communication with a valve device 126 and an air inlet passageway 128. Air inlet passageway 128 extends through pressure foot 58. An air outlet passageway 130 extends through drill bushing 60 and terminates into a chamber 132 near the exit end of drill bushing 60 so as provide an air blast to drill bit 120. An intermediate air passageway 134 extends through collet housing 28 and interconnects air inlet passageway 128 and air outlet passageway 130, thereby defining a fluid path between air source 124 and the exit end of drill bushing 60 so as to provide air blast to drill bit 120 during a drilling operation. The compressed air travels from chamber 132 down the threads or flutes of drill bit 120 to clear the flutes of debris. It should be understood from the drawings that the compressed air combines with the lubricating oil to form a lubricating mist at the tip of drill bit 120. Such lubricating mist is particularly useful when drilling into metals such as titanium and the like, where considerable amounts of heat is produced during the drilling process.

Briefly, during operation, drilling end effector 10 is positioned adjacent a part to be drilled by a robotic arm (not shown). The robotic arm positions drilling end effector 10 such that drill bushing 60 just contacts the part to be drilled. The positioning of drilling end effector 10 is determined and tracked in three-dimensional space by a photogrammetry sensor which detects photogrammetry targets 38. A microprocessor or controller (not shown) thus manipulates drilling end effector 10 relative to the part to be drilled without the use of jigs or other hard machining supports for determining position.

Pneumatic cylinders 16, having a constant pressure, act as air springs to provide a clamping force to provide material clamp up. This operation is capable of applying approximately 250 lbs of clamping force according to the present embodiment. Once a predetermined clamping force is achieved, drill bit 120 is then extended into engagement with the part to be drilled. During this time, lubrication mist is introduced as a result of the combining of lubricant from lubrication system 108 and air from air blast system 110. This lubricating mist serves to cool, lubricate, and clean drill bit 120 during the drilling process. The lubricating mist and any chips or other debris are vacuumed by vacuum attachment collar assembly 30. Drilling will continue until micrometer 202 contacts switch input 220 of air logic switch 206, thereby sending a control signal to terminate the drilling operation.

During this process, the controller monitors the cycle time necessary to drill each hole. This cycle time is then compared to a known cycle length or to the first cycle length. By monitoring this cycle time and comparing it to previous cycle times, an operator can be flagged that the drilling bit is beginning to dull or that other complications have arisen where the cycle lengthens.

The drilling end effector of the present invention provides a number of advantages over the prior art. That is, the present invention is capable, in part, of at least determining its position accurately within a three dimensional space, providing its own feed axis (thereby not relying on the robotic arm), applying a clamping force while drilling, sensing the surface of the part to be drilled to accommodate variations in distance between the drill bit and the part to ensure depth repeatability, and lubricating and cleaning the drill bit while working in a confined area with no external pipes near the drilling bit.

Figure 10:
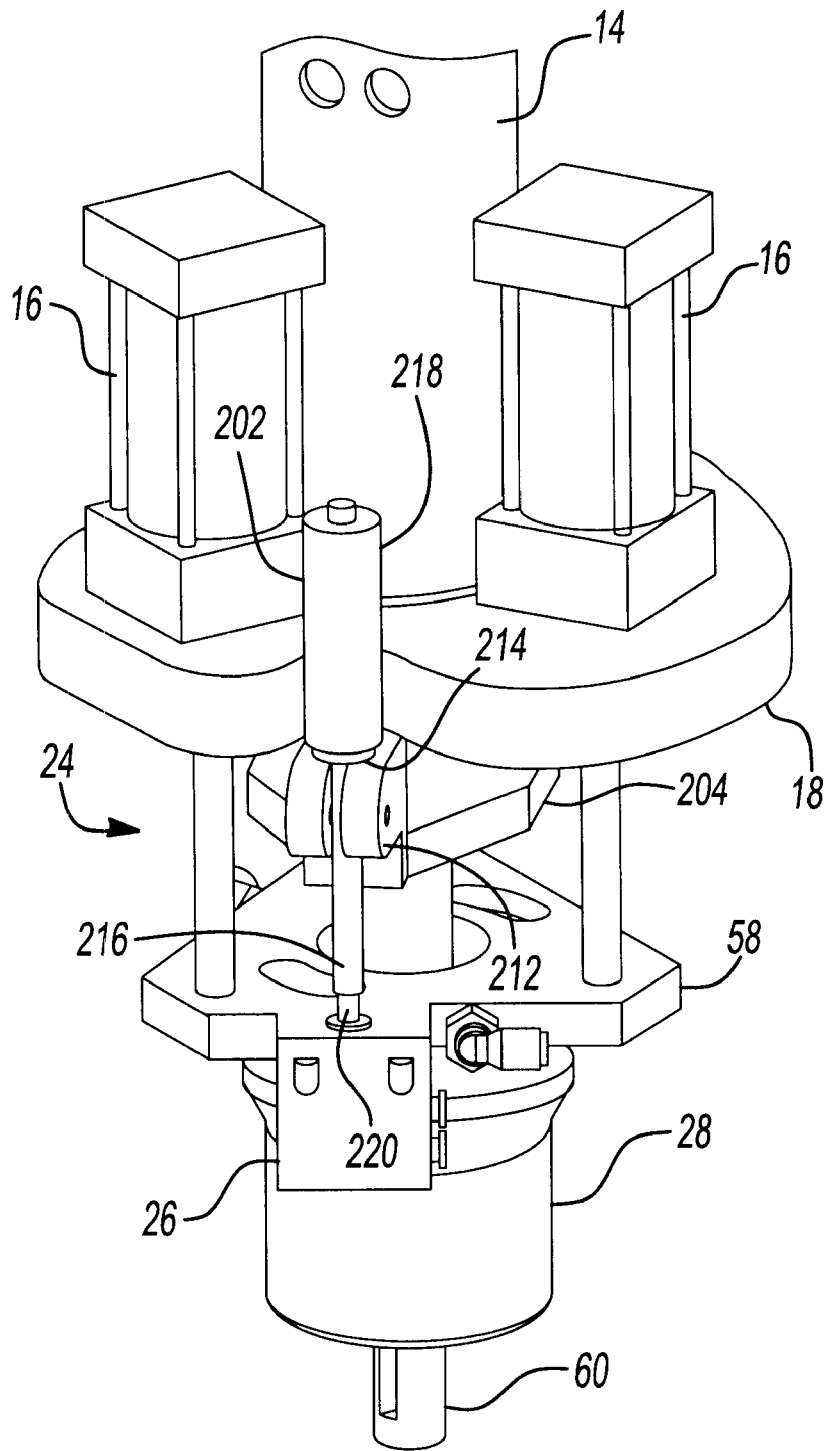
FIG. 10 is an enlarged perspective view illustrating a lower section of the drilling end effector according to a second embodiment of the present invention.
Figure 11:
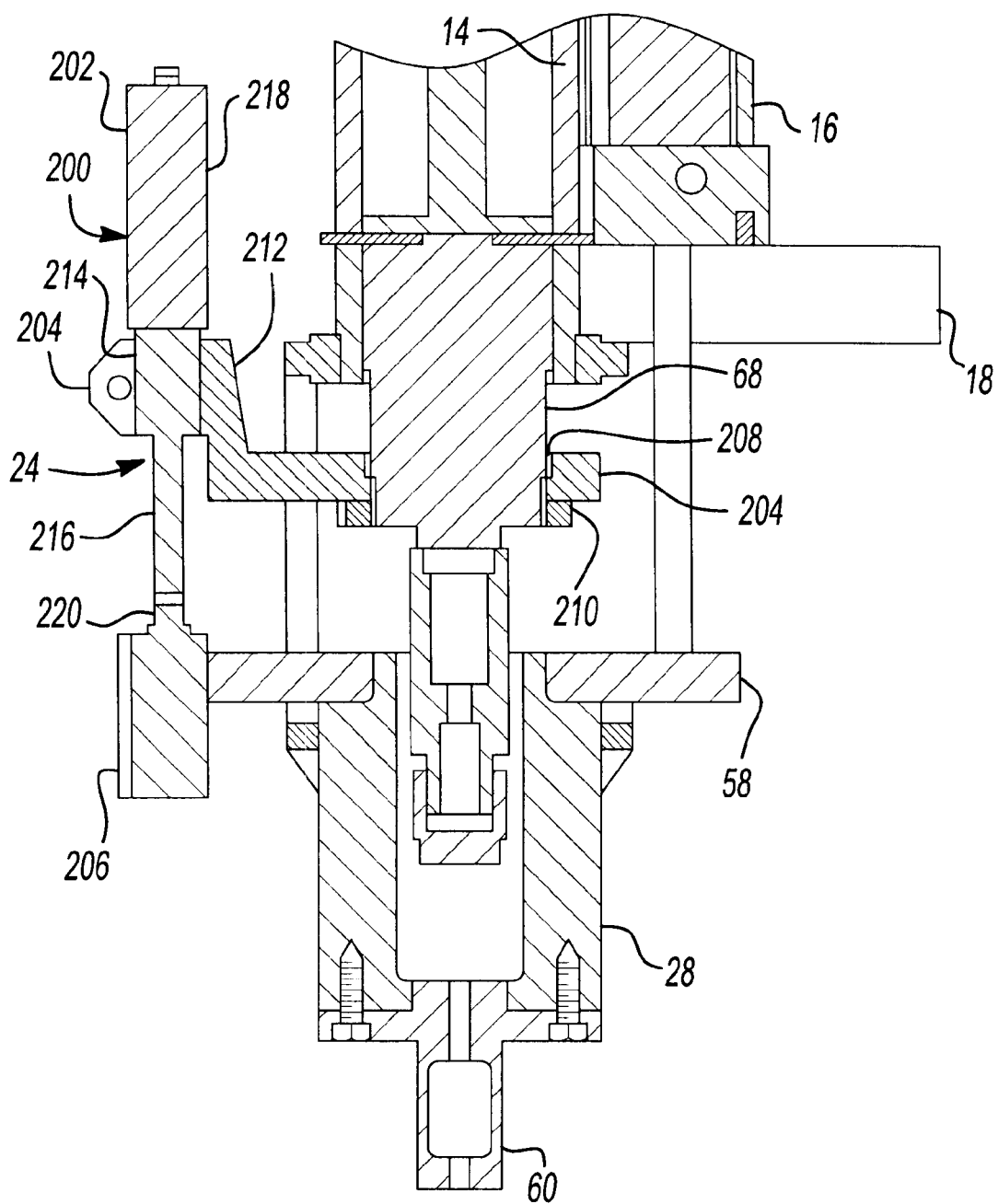
FIG. 11 is an enlarged cross sectional view illustrating the lower section of the drilling end effector of FIG. 10 having portions removed for clarity

According to a second embodiment of the present invention illustrated in FIGS. 10 and 11, adjustable hard stop assembly 24 may be replaced with a micrometer bracket assembly 200 to provide drilling depth and/or countersink depth control of the drill bit 120. Micrometer bracket assembly 200 includes a micrometer 202, a micrometer bracket 204, and an air logic switch 206. Micrometer bracket 204 is coupled to a quill 68 of drill motor 14. Specifically, micrometer bracket 204 includes an aperture 208 sufficiently sized to surround quill 68 of drill motor 14. Preferably, a press fit connection exists between micrometer bracket 204 and quill 68. To further retain micrometer bracket 204 in a stationary position relative to drill motor 14, a threaded nut 210 is threaded onto quill 68 of drill motor 14 to further retain micrometer bracket 204 on quill 68.

Micrometer 202 is further fastened to micrometer bracket 204. To this end, micrometer bracket 204 includes a support arm 212. Support arm 212 includes an aperture 214 extending therebetween that is sized to receive micrometer 202 therethrough. Preferably, aperture 214 creates a press fit with micrometer 202. More preferably, micrometer 202 is retained within aperture 214 of micrometer bracket 204 with a clamping pin extending between support arm 212 and, thereby, urging support arm 212 together. This arrangement creates a higher retaining force for securing micrometer 202 relative to drill motor 14.

Micrometer 202 includes a measuring leg 216 extending downwardly therefrom. Measuring leg 216 may be manually adjusted via a micrometer control knob 218 in a conventional manner. Air logic switch 206 is fixedly mounted to pressure foot 58 for movement therewith. Air logic switch 206 includes a switch input 220 that is positioned directly below measuring leg 216 of micrometer 202. In operation, micrometer 202, in concert with air logic switch 206, provides an accurate means of determining the exact extension or retraction of pressure foot 58 and drill bushing 60 relative to drill motor 14 and back plate 20. Specifically, during operation drilling end effector 10 is moved into position adjacent the part to be worked such that drill bushing 60, collet housing 28, and pressure foot 58 are slightly depressed, thereby providing material clamp up. During a drilling operation, micrometer 202 approaches and eventually contacts switch input 220 of air logic switch 206. Switch input 220, with pressurized air upstream, opens and sends an air signal to the robot controller to stop the drilling operation. It has been found that this system enables drill depth to be accurately and repeatedly formed within approximately 0.002".

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of using a drilling end effector comprising:
   providing a drilling end effector having a plurality of photogrammetry targets secured thereto;
   detecting the positional orientation of said drilling end effector using a photogrammetry sensor to determine the orientation of said plurality of photogrammetry targets along three linear degrees of freedom and three rotational degrees of freedom and outputting a position signal to a controller;
   manipulating said drilling end effector adjacent to a part to be drilled in response to said position signal; and
   extending a drill bit into drilling engagement with said part to be drilled to provide a drilling operation.

2. The method according to claim 1 wherein said step of manipulating said drilling end effector being accomplished using a robotic arm assembly.

3. The method according to claim 2 wherein said step of manipulating said drilling end effector adjacent to a part to be drilled including contacting a drill bushing of said drilling end effector and said part to be drilled.

4. The method according to claim 1, further comprising:
   actuating at least one actuator to providing a clamping force between said drilling end effector and said part to be drilled.

5. The method according to claim 4 wherein said step of actuating at least one actuator to providing a clamping force between said drilling end effector and said part to be drilled includes actuating a pneumatic cylinder coupled between a drill motor and a pressure foot member.

6. A method of using a drilling end effector comprising:
   providing a drilling end effector having a plurality of photogrammetry targets secured thereto;
   detecting the positional orientation of said drilling end effector using a photogrammetry sensor to determine the orientation of said plurality of photogrammetry targets and outputting a position signal to a controller;
   manipulating said drilling end effector adjacent to a part to be drilled in response to said position signal;
   extending a drill bit into drilling engagement with said part to be drilled to provide a drilling operation; and
   lubricating said drill bit during said drilling operation.

7. The method according to claim 6 wherein said step of lubricating said drill bit during said drilling operation includes combining a lubricant and pressurized air to form a lubricating mist sufficient to cool, lubricate, and clean said drill bit.

8. The method according to claim 1, further comprising:
   vacuuming at least a portion of debris produced during said drilling operation.

9. The method according to claim 1, further comprising:
   removing said drill bit from said drilling engagement with said part to be drilled once a predetermined drill depth is achieved.

10. The method according to claim 9 wherein said step of removing said drill bit from said drilling engagement with said part to be drilled once a predetermined drill depth is achieved includes providing a micrometer contact switch capable of outputting a drill depth signal to said controller, said controller removing said drill bit from drilling engagement with said part to be drilled once said drill depth signal is received.

11. A method of using a drilling end effector comprising:
    providing a drilling end effector having a plurality of photogrammetry targets secured thereto;
    detecting the positional orientation of said drilling end effector using a photogrammetry sensor to determine the orientation of said plurality of photogrammetry targets and outputting a position signal to a controller;
    manipulating said drilling end effector adjacent to a part to be drilled in response to said position signal;
    extending a drill bit into drilling engagement with said part to be drilled to provide a drilling operation;
    monitoring a drilling cycle time; and
    comparing said drilling cycle time to a predetermined cycle time to detect drilling complications.

12. A method of using a drilling end effector comprising:
    providing a drilling end effector having a plurality of photogrammetry targets secured thereto;
    mounting said plurality of photogrammetry targets upon generally angular brackets disposed on side panels of a housing of said drilling end effector;
    detecting the positional orientation of said drilling end effector using a photogrammetry sensor to determine the orientation of said plurality of photogrammetry targets and outputting a position signal to a controller;
    manipulating said drilling end effector adjacent to a part to be drilled in response to said position signal; and
    extending a drill bit into drilling engagement with said part to be drilled to provide a drilling operation.

13. A method of using a drilling end effector comprising:

providing a drilling end effector having a plurality of photogrammetry targets secured thereto;

detecting the positional orientation of said drilling end effector using a photogrammetry sensor to determine the orientation of said plurality of photogrammetry targets and outputting a position signal to a controller;

robotically manipulating said drilling end effector adjacent to a part to be drilled in response to said position signal;

actuating at least one actuator to providing a clamping force between said drilling end effector and said part to be drilled;

extending a drill bit into drilling engagement with said part to be drilled to provide a drilling operation;

lubricating said drill bit during said drilling operation; and vacuuming at least a portion of debris produced during said drilling operation.

14. The method according to claim 13 wherein said step of detecting the positional orientation of said drilling end effector being along three linear degrees of freedom and three rotational degrees of freedom.

15. The method according to claim 13 wherein said step of actuating at least one actuator to providing a clamping force between said drilling end effector and said part to be drilled includes actuating a pneumatic cylinder coupled between a drill motor and a pressure foot member.

16. The method according to claim 13 wherein said step of lubricating said drill bit during said drilling operation includes combining a lubricant and pressurized air to form a lubricating mist sufficient to cool, lubricate, and clean said drill bit.

17. The method according to claim 13, further comprising:

monitoring a drilling cycle time; and comparing said drilling cycle time to a predetermined cycle time to detect drilling complications.

18. The method according to claim 13 wherein said step of providing a drilling end effector having a plurality of photogrammetry targets secured thereto includes mounting said plurality of photogrammetry targets upon generally angular brackets disposed on side panels of a housing of said drilling end effector.

19. A method of using a drilling end effector comprising:

providing a drilling end effector having a plurality of photogrammetry targets secured thereto;

detecting the positional orientation of said drilling end effector along three linear degrees of freedom and three rotational degrees of freedom using a photogrammetry sensor to determine the orientation of said plurality of photogrammetry targets and outputting a position signal to a controller;

robotically manipulating said drilling end effector adjacent to a part to be drilled in response to said position signal;

actuating at least one actuator to providing a clamping force between said drilling end effector and said part to be drilled;

extending a drill bit into drilling engagement with said part to be drilled to provide a drilling operation;

lubricating said drill bit during said drilling operation by combining a lubricant and pressurized air to form a lubricating mist sufficient to cool, lubricate, and clean said drill bit;

vacuuming at least a portion of debris produced during said drilling operation;

monitoring a drilling cycle time; and comparing said drilling cycle time to a predetermined cycle time to detect drilling complications.

* * * * *